United States Patent
Cimpean

(10) Patent No.: US 10,112,559 B1
(45) Date of Patent: Oct. 30, 2018

(54) MOTOR VEHICLE LATCHING SYSTEM WITH A DRIVE AND AN ELECTRONIC BRAKING DEVICE

(71) Applicant: Kiekert AG, Heiligenhaus (DE)

(72) Inventor: Octavian Cimpean, Rochester Hills, MI (US)

(73) Assignee: Kiekert AG, Heiligenhaus (DE)

( * ) Notice: Subject to any disclaimer, the term of this patent is extended or adjusted under 35 U.S.C. 154(b) by 0 days.

(21) Appl. No.: 15/656,008

(22) Filed: Jul. 21, 2017

(51) Int. Cl.
| | |
|---|---|
| B60R 16/03 | (2006.01) |
| E05B 81/06 | (2014.01) |
| E05B 81/54 | (2014.01) |
| E05B 81/16 | (2014.01) |
| E05B 81/34 | (2014.01) |
| E05B 81/20 | (2014.01) |
| H01R 13/631 | (2006.01) |
| H01R 13/64 | (2006.01) |
| H01R 31/06 | (2006.01) |
| H01R 13/73 | (2006.01) |
| E05B 83/36 | (2014.01) |
| E05B 83/18 | (2014.01) |
| E05B 85/22 | (2014.01) |

(52) U.S. Cl.
CPC ............. *B60R 16/03* (2013.01); *E05B 81/06* (2013.01); *E05B 81/16* (2013.01); *E05B 81/20* (2013.01); *E05B 81/34* (2013.01); *E05B 81/54* (2013.01); *H01R 13/631* (2013.01); *H01R 13/64* (2013.01); *H01R 13/73* (2013.01); *H01R 31/06* (2013.01); *B60Y 2410/115* (2013.01); *E05B 83/18* (2013.01); *E05B 83/36* (2013.01); *E05B 85/22* (2013.01)

(58) Field of Classification Search
CPC H01R 13/66; H01R 13/6608; H01R 13/6616; H01R 13/6641; H01R 13/665
See application file for complete search history.

(56) References Cited

U.S. PATENT DOCUMENTS 4,239,319 A * 12/1980 Gladd ................ H01R 13/6641
439/620.21
6,522,095 B2 2/2003 Kachouh

FOREIGN PATENT DOCUMENTS

| WO | 00/19045 A1 | 7/2000 |
|---|---|---|
| WO | 2006/069564 A2 | 7/2006 |

\* cited by examiner

*Primary Examiner* — Ross Gushi
(74) *Attorney, Agent, or Firm* — Renner, Otto, Boisselle & Sklar, LLP

(57) ABSTRACT

The task of the invention is to provide a motor vehicle latching system with an actuator and an electronic component switched in parallel in a technically simple and reliable manner which prevents undesired return movements of the actuator.

Figure 1:
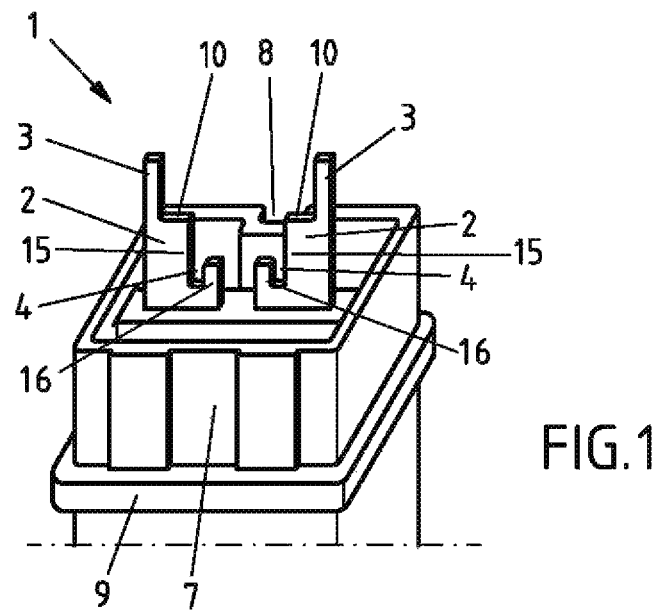

The task is solved by a latching system with an electrical drive having an electrical plug-in connector component and with an external electrical plug-in connector component (1), which is connected to the electrical plug-in connector component of the electrical drive and which has an electronic braking device for the electrical drive, whereby the external electrical plug-in connector component (1) has two electrical contacts (2, 3) which each have a recess (4) which is open on one side in which an electrical conductor of the electronic braking device is accommodated in each instance.

9 Claims, 1 Drawing Sheet

MOTOR VEHICLE LATCHING SYSTEM WITH A DRIVE AND AN ELECTRONIC BRAKING DEVICE

The invention relates to a motor vehicle latching system with an electrical drive and an electronic braking device for the drive. A latching system for a motor vehicle according to the invention can encompass inter alia a locking mechanism, an activation device for opening of the locking mechanism, a bolting device, an anti-theft device and a child lock. The invention also relates to a plug-in connector component for a motor vehicle latching system.

BACKGROUND

A locking mechanism provided for latching of a door or flap comprises at least one catch and at least one pawl. The catch can be pivoted from an open position to a closed position via a locking bolt of a door or a flap. The pawl ratchets the catch in the latched position. The locking bolt can then no longer leave the locking mechanism as the catch can no longer be pivoted back into its open position. For opening, the pawl must initially be moved out of its ratchet position, i.e. lifted from the catch. The catch can subsequently be pivoted back into its open position. The locking bolt can then leave the fork-shaped inlet slot of the catch again and thus the locking mechanism. A pertaining door or flap can be opened.

There can be two ratchet positions, namely a so-called pre-ratchet position and a main ratchet position. If a catch is ratcheted in the pre-ratchet position, the pertaining door or flap is not yet completely latched. The catch can then be further rotated in the direction of the main ratchet position in order to be ratcheted in the main ratchet position. A pertaining door or flap is then completely latched. The catch can be rotated from the pre-ratchet position to the main ratchet position with the aid of an electrical drive, for example an electromotor.

Unratcheting of the locking mechanism is performed with the aid of an activation device. If a pertaining activation device is activated, an associated locking mechanism of a door or flap is then unratcheted, i.e. opened. The pertaining door or flap can then be opened. Unratcheting can also occur with the aid of an electrical drive, an electromotor, for example.

A motor vehicle latching system can also be bolted. In the bolted state, a locking mechanism can no longer be opened externally by activation of an external activation element, such as an external door handle. In order to provide improved protection from theft, bolting also takes place in such a way that opening can also no longer take place by activating an internal activation element. In the engaged state, a child lock also prevents a rear door of a motor vehicle being able to be opened from inside. The bolting, unbolting, engagement or disengagement of an anti-theft device or a child lock can also be performed with the aid of an electrical drive, especially an electromotor.

An electrical drive should regularly only move a relevant component in a motor vehicle latching system in one direction and consequently only work in one direction. A return movement of the component then occurs in another manner for example, with the aid of the force of a pre-tensioned spring.

An electrical drive can execute undesired return movements in an unscheduled manner. This can be prevented by an electronic braking device according to WO 00/19045 A1, namely with the aid of a transistor, a thyristor or a triac. It is known from U.S. Pat. No. 6,522,095 B2 to minimize such undesired return movements on an electrical actuator with the aid of a diode switched in parallel which acts as an electronic braking device.

An electrical drive for a motor vehicle latching system is known from WO 2006/069564 A2. This is connected to the electrics of the latching system with the aid of an electrical plug-in connector. An external plug with two electrical contacts with pin-shaped ends can be available which is plugged into a jack of the electrical drive for electrical connection. Alternatively, the electrical drive can have the plug which is connected to a jack for electrical connection.

SUMMARY

The task of the invention is to provide a motor vehicle latching system with an actuator and an electronic component switched in parallel in a technically simple and reliable manner which prevents undesired return movements of the actuator.

The task is solved by a latching system with the characteristics of the first claim. Advantageous designs result from the dependent claims. The subclaim relates to a plug-in connector component provided to solve the task.

The task is solved by a latching system with an electrical drive which has an electrical plug-in connector component, a jack for example. The plug-in connector component of the electrical drive is connected to an external electrical plug-in connector component for the supplying of power. The electrical drive is thus electrically connected. The external electrical plug-in connector component has an electronic braking device for the electrical drive. The external electrical plug-in connector component has two electrical contacts which respectively have a recess open on one side in which an electrical conductor of the electronic braking device is accommodated in each instance. The two electrical contacts are connected to two electrical contacts of the electrical drive in the mounted state. The electrical drive is supplied with power by means of this where necessary.

In a latching system of a motor vehicle, electrical contacts are exposed to great stresses due to environmental impacts and vibrations a latching system of a motor vehicle. Even in the case of an accident, electrical contacts should still be functional, if possible, and especially so on door latching systems. The design according to the invention attains this and also a technically simple manufacture. Mounting is simple and can easily be automated as electrical conductors can be inserted into the recesses. Both recesses are preferably formed by a laterally protruding hook to minimize the production cost in a further improved manner. The conductors can then be reliably and durably secured in the recesses using a soldering connection. This type of securing for electrical conductors of an electronic braking device for an electromotor constitutes a separate invention. The electrical contacts of the electromotor can therefore also have laterally protruding hooks into which electrical conductors of an electronic braking device are then inserted and secured by soldering connections here. The electronic braking device can thus be accommodated within the housing of the external electrical plug-in connector component to protect it from external impacts.

The electronic braking device preferably has a diode switched in parallel in order to thus counteract rebound effects with low technical expenditure.

The external electrical plug-in connector component is in one design an adapter which on the one hand is connected to an electrical plug-in connector component of the electrical drive and on the other hand is connected to a further electrical plug-in connector component. In this design, the external electrical plug-in connector component therefore constitutes an additional component which enables an electrical drive to be easily retrofitted with an electronic braking device. In one design, the adapter can be connected to the electrical drive in an interlocking manner in such a way that it can subsequently only be detached with the aid of a tool or by destruction of the electrical drive. An electrical drive can thus easily be retrofitted with an electronic braking device at any time in such a way and supplied in this form for further processing.

The components of the electrical plug-in connector advantageously encompass ratchet elements which are ratcheted together in such a way that unscheduled detachment is prevented.

The electrical drive is generally an electromotor or an electromotor with a gearbox, and is able to electrically unratchet a locking mechanism of the latching system, to bolt the latching system, to engage an anti-theft device or a child lock and/or to pivot a catch from a pre-ratchet position in the direction of the main ratchet position. Alternatively or additionally, the electrical drive can encompass further components which serve a drive, for example a bolt which can be moved in a linear manner by the electromotor by means of a mechanism.

The invention also relates to an electrical plug-in connector component with an integrated electronic braking device connection to an electrical plug-in connector component of an electrical drive. This electrical plug-in connector component has a plastic housing having a front section for connection to a further plug-in connector component. The front section is inserted during mounting into a pertaining counterpiece of the electrical plug-in connector component of the electrical drive. The electrical plug-in connector is overall formed in such a way that the two electrical plug-in connector components can only be connected in precisely one way. In order to attain this, the front section is generally not rotationally symmetrical in the sectional view. The electrical plug-in connector component has two electrical contacts which are generally made of metal via which the electrical drive will be supplied with power. In a simple design, a diode that is electrically connected to the two electrical contacts acts as an electronic braking device. By connecting in precisely one way, it is ensured that the diode is mounted correctly aligned and switched in parallel to the electromotor when the two electrical plug-in connector components are connected.

Figure 2:
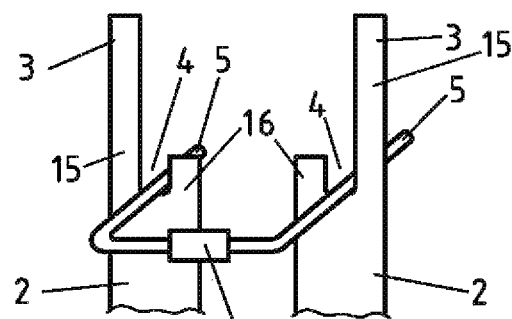

The following are shown:
FIG. 1: external electrical plug;
FIG. 2: electrical contacts with diode; and
FIG. 3 electromotor 11 with an electrical jack 12.

DETAILED DESCRIPTION

FIG. 1 shows an external electrical plug 1 and thus a plug-in connector component of a plug-in connector with which an electromotor of a motor vehicle latching system is electrically connected.

The external electrical plug 1 has two electrical contacts 2 made of metal with pin-shaped ends 3 which are inserted into two electrical countercontacts of the electromotor for electrical connection. The countercontacts can have a hollow shape into which the pin-shaped ends 3 are inserted for electrical connection. The two electrical contacts 2 each have a recess 4 provided by laterally protruding hooks as shown. The two electrical contacts have a first leg 15 in each instance and a second leg 16 between which the recess 4 is formed. The first leg 15 is twice as long as the second leg 16 in the execution example shown. In other designs, the length ratios of the first leg 15 and the second leg 16 can have values other than two to one, for example both legs 15, 16 can be of equal length. In each recess 4 an electrical connection 5 of a diode 6 is incorporated (see FIG. 2). The electrical connections are mechanically and electrically connected to the hook by a soldering connection. The diode 6 is located within a front part 7 of the housing of the external electrical plug-in connector component. The front section 7 of the plastic housing connected to the electromotor is essentially square-shaped in the sectional view and has one or several indentations 8 in such a way that the front section 7 of the housing is not rotationally symmetrical in the sectional view. This front section 7 of the housing is inserted into a mounting of the electromotor provided therefore. A corresponding socket-shaped mounting of the electromotor is also essentially square-shaped in the sectional view and has correspondingly to the one or several indentations 8 one or several bridges present on the relevant inner sides of the quadratic basic shape. It is hereby ensured that the electrical plug 1 can only be connected to the electromotor in precisely one way. It is thus attained that the diode 6 is switched in parallel with the electromotor in a correct alignment during mounting.

The electrical plug can has a circumferential stop 9 on the lower edge of the front section 7 which limits the insertion of the plug 1 into the jack-shaped mounting of the electromotor. Alternatively or additionally, the two contacts can be step-shaped in order to provide such a stop 10 in each instance by the step shape. These stops 10 can therefore alternatively or additionally limit insertion.

Figure 3:
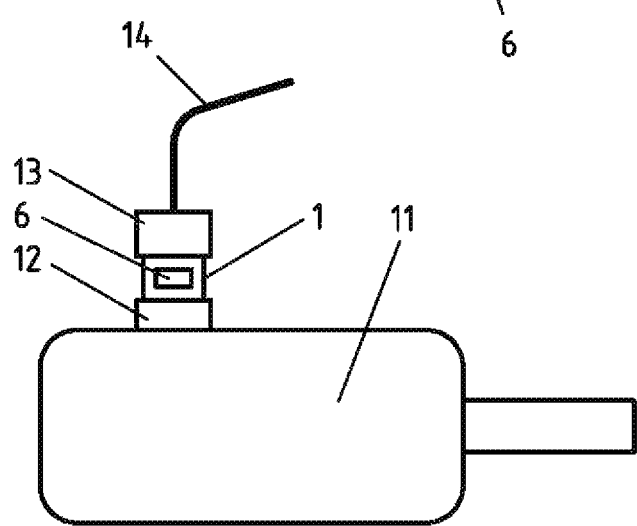

FIG. 3 shows an electromotor 11 with an electrical jack 12. The electrical external plug-in connector component 1 encompassing an electronic braking device 6 is inserted into the jack 12 on the basis of ratchets in a non-detachable manner. In the case of FIG. 3, the external plug-in connector component 1 is an adapter.

However, the jack 12 and adapter 1 can also be connected in an interlocking manner in such a way that at best they can only be detached in a non-destructive manner with the aid of a tool. On the other side of the adapter, an electrical plug 13 with a connected electrocable 14 is inserted into the adapter 1 in a non-detachable manner by means of a ratchet. The electrical drive 11 is electrically connected by means of an electrical plug-in connector 12, 1, 13. However, the adapter 1 can also have been connected to the plug 13 by means of insertion in such a way that the adapter 1 can no longer be detached in a destruction-free manner from the plug 13 without a tool. However, the adapter 1 can then in principle be detached from the jack 12 in a destruction-free manner without requiring a tool. Instead of a plug 13 a jack can be provided for which is connected to the adapter 1.

REFERENCE SIGN LIST

1: external electrical plug-in connector component
2: electrical contact
3: pin-shaped end
4: recess
5: electrical connection
6: diode
7: housing front section
8: indentation
9: stop
10: stop 11: electromotor
12: jack
13: plug
14: electrocable
15: leg
16: leg

What is claimed is:

1. A latching system comprising:
an electrical drive that is operable in a first direction and has an electrical jack;
an external electrical plug-in connector component which is insertable into the electrical jack of the electrical drive, wherein the external electrical plug-in connector component has a housing and two electrical contacts which are arranged in the housing and each have a recess which is open on one side; and
an electronic braking device configured to prevent the electrical drive from operating in a second direction opposite the first direction, the electronic braking device having electrical conductors that are accommodated in each recess, wherein the electronic braking device is arranged in the housing of the external electrical plug-in connector component and is aligned with the electrical drive when the external electrical plug-in connector component is inserted into the electrical jack.

2. The latching system of claim 1, wherein one electronic component of the electronic braking device is connected to the two electrical contacts of the external electrical plug-in connector component.

3. The latching system of claim 1, wherein at least one of the recesses have a U-shape that is defined by two legs.

4. The latching system of claim 1, wherein the electronic braking device has a diode that is switchable to have a parallel connection with the electrical device.

5. The latching of claim 1, wherein the electrical conductors of the electronic braking device are held in the recesses by the electrical contacts of the external electrical plug-in connector component.

6. The latching system of claim 1, wherein the external electrical plug-in connector component has a non-rotationally symmetrical front section which is insertable into a corresponding complementary portion of the electrical jack, whereby the electrical jack and the external electrical plug-in connector component are only connectable in one way.

7. The latching system of claim 1, wherein the electrical drive is operable to electrically unratchet a locking mechanism of the latching system, electrically bolt the latching system, engage an anti-theft device or a child lock or pivot a catch from a pre-ratchet position in the direction of the main ratchet position.

8. The latching system of claim 1, wherein the external electrical plug-in connector component is an adapter.

9. The latching system as in claim 1, wherein the housing is made of plastic and has a non-rotationally symmetrical front section in the sectional view for connection to a further plug-in connector component, wherein the two electrical contacts are made of metal and the electronic braking device has a diode electrically connected to the two electrical contacts.

* * * * *